United States Patent [19]

Price et al.

[11] 4,039,612
[45] Aug. 2, 1977

[54] PROCESS FOR EXTRACTING COBALT, COPPER OR ZINC VALUES USING A 1-ALKYL SUBSTITUTED BENZIMIDAZOLE

[75] Inventors: Raymond Price; Peter Smith, both of Manchester, England

[73] Assignee: Imperial Chemical Industries Limited, London, England

[21] Appl. No.: 691,296

[22] Filed: June 1, 1976

[30] Foreign Application Priority Data

June 9, 1975 United Kingdom .............. 24626/75

[51] Int. Cl.$^2$ .......................... C01G 3/00; C07F 1/08; C01G 9/00; C01G 51/00
[52] U.S. Cl. ..................................... 423/24; 423/100; 423/139; 260/299
[58] Field of Search .................... 423/139, 24, 100; 75/658.5, 101 BE; 260/299; 210/21, 38

[56] References Cited

U.S. PATENT DOCUMENTS

| 2,065,418 | 12/1936 | Andersag et al. | 260/299 |
| 3,131,998 | 5/1964 | Swanson | 423/139 |
| 3,843,667 | 10/1974 | Cupery | 423/139 |

OTHER PUBLICATIONS

Durdyev, *Chemical Abstracts,* vol. 77 (1972) 42,746t.
Artemenko et al., *Chemical Abstracts,* vol. 76 (1972) 80,389r.
Hoffman, K. *Imidazole and its Derivatives,* Interscience N.Y. (1953) pp. 21, 247–250, 379–382, 388.
Bose et al., *J. Inorg. Nucl. Chem.,* (1971) vol. 33, pp. 755, 756.

*Primary Examiner*—O. R. Vertiz
*Assistant Examiner*—Brian E. Hearn
*Attorney, Agent, or Firm*—Cushman, Darby & Cushman

[57] ABSTRACT

Optionally substituted benzimidazoles containing an alkyl or cycloalkyl group in position 1 and containing at least 5 alkyl or cycloalkyl carbon atoms extract metals from aqueous solutions of their salts into water-immiscible organic solvents in presence of halide ion. Benzimidazoles having a branched-chain alkyl group of at least 7 carbon atoms in position 1, and especially mixtures of such compounds, are most effective. The benzimidazoles are particularly useful for extracting cobalt selectively from mixtures of cobalt and nickel salts. The metals can be recovered from the organic solvent by extraction into water free from halide ion.

6 Claims, No Drawings

PROCESS FOR EXTRACTING COBALT, COPPER OR ZINC VALUES USING A 1-ALKYL SUBSTITUTED BENZIMIDAZOLE

This invention relates to a process for the extraction of metal values from aqueous solutions of metal salts and in particular to a process in which the metal is extracted in the form of a complex with a monodentate complexing agent.

One of the methods of extracting metals from their ores is to crush the ore and extract it with, for example acids to give an aqueous solution of a salt of the desired metal, usually together with salts of other metals also present in the ore. The aqueous solutions may then be treated with a complexing agent such as an o-hydroxyphenyl ketoxime which will form a complex compound with the desired metal under the conditions of treatment, which complex compound is extracted as a solution in a water-immiscible organic solvent. It is convenient to use a solution of complexing agent in the solvent and to carry out the treatment and extraction simultaneously. This procedure has the disadvantage that the degree of extraction is pH dependent, the pH itself decreasing as the extraction progresses. Furthermore many complexing agents such as the ketoximes are slightly unstable in the hydrolytic conditions employed. The present invention relates to the use of complexing agents which have relatively little effect on the pH of the metal salt solution, and which in general are resistant to hydrolysis. The present complexing agents also have advantages in that the rate of transfer of metal between the aqueous and organic phases, and also the rate of phase disengagement, are very fast.

According to the invention there is provided a process for extracting metal values from aqueous solutions which comprises contacting the aqueous solutions in presence of halogen or psuedohalogen anions with a solution in a water-immiscible organic solvent of a compound of formula I.

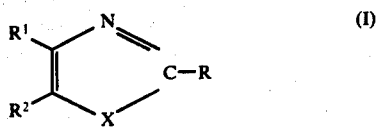

wherein R is a hydrogen atom or a methyl, ethyl or vinyl group, $R^1$ and $R^2$, which may be the same or different, are each a hydrogen or halogen atom, a nitro or cyano group, an optionally substituted hydrocarbon group attached directly or through an oxygen atom to the rest of the molecule, or both together with the two carbon atoms joining them form an optionally substituted ring, and X is an oxygen or sulphur atom, or a group of the formula $-CR^3=CR^4-$ wherein $R^3$ and $R^4$, which may be the same or different, are each a hydrogen atom or an alkyl, alkoxy or aryloxy group or X is a group of the formula $-NR^5-$ wherein $R^5$ is an optionally substituted aliphatic or cycloaliphatic hydrocarbon group, said compound containing a total of at least five alkyl, alkenyl or cycloalkyl carbon atoms, and separating the aqueous phase from the organic phase which contains in solution or suspension a complex compound of the metal with the compound I.

It is preferred that R be a hydrogen atom.

As optionally substituted hydrocarbon groups which may be represented by $R^1$ or $R^2$ attached directly or through an oxygen atom to the rest of the molecule there are mentioned alkyl groups which may be primary, secondary or tertiary and straight-chain or branched such as methyl, ethyl, isopropyl, butyl, amyl, hexyl, heptyl, octyl, nonyl, decyl and dodecyl, alkenyl groups such as allyl, cycloalkyl groups such as cyclohexyl, aralkyl groups such as benzyl and phenylethyl, aryl such as phenyl, o-, m- and p-tolyl and substituted derivative of these such as alkoxyalkyl for example 2-methoxyethyl, aryloxyalkyl for example p-nonylphenoxyethyl, p-octylphenoxyethyl and p-dodecylphenoxyethyl, o-, m- and p-chlorophenyl, o-, m- and p-nitrophenyl, p-nonylphenyl and o-, m- and p-methoxyphenyl.

As halogen atoms which may be represented by $R^1$ or $R^2$ which may be mentioned for example bromine and especially chlorine.

As rings which may be formed by $R^1$ and $R^2$ and the two carbon atoms joining them there is mentioned especially the benzene ring. Any of these rings may be substituted by one or more groups of the type $R^1$ are attached directly or through an oxygen atom or groups such as chlorine, bromine, nitro, cyano, carbalkoxy such as carbomethoxy or carboethoxy or acyl such as acetyl.

As groups which may be represented by $R^5$ there are mentioned any of the optionally-substituted aliphatic, cycloaliphatic, aralkyl or aryl hydrocarbon groups which may be represented by $R^1$. It is preferred that $R^5$ be a group, especially an optionally substituted alkyl or cycloalkyl group, containing at least 7 aliphatic or alicyclic carbon atoms, for example octyl, nonyl, isodecyl or p-nonylphenoxyethyl, since in these cases better disengagement takes place between the aqueous and organic phases in the metal extraction process.

As alkyl groups which may be represented by $R^3$ or $R^4$ there are mentioned especially methyl groups, but each may if desired be an ethyl or higher alkyl group.

It is preferred that the compounds contain at least seven, and more particularly at least nine, alkyl, alkenyl or cycloalkyl carbon atoms, since such groups increase the solubility of the compound and the metal-complexes formed therefrom in water-immiscible organic solvents. It is not usually advantageous to have more than 25 alkyl, alkenyl or cycloalkyl carbon atoms. The optimum effect on solubility is obtained from alkyl groups which are branched.

Especially valuable for use in the process owing to their high solubility and that of their complexes in the organic solvents are mixtures of compounds of the formula I, in which the compounds may differ significantly in composition or may merely differ for example in the configuration of an alkyl group, as for example in the nonyl groups in the mixtures of branched nonylphenols obtained from phenols by alkylation with propylene trimer or of branched isodecyl groups in which the source of the decyl group is decanol obtained by carbonylation of propylene trimer.

As specific compounds of formula I there may be mentioned imidazoles such as 1-nonylimidazole, thiazoles and as 5-nonylthiazole, oxazoles such as 5-nonyloxazole, pyridines such as 4-undecylpyridine, 2-methyl-4-undecylpyridine, and 2-undecylpyridine, benzimidazoles such as 5-octyl- and 5-nonyl-1-methylbenzimidazole, 4-methyl-1-nonyl and 1-decyl benzimidazoles, 5-methyl-1-heptylbenzimidazole, 5-nonyl- and 5-decyl-1,2-dimethylbenzimidazoles, 2,5-dimethyl-1-nonyl and 1-decyl-benzimidazoles, 5-dodecyl-1-methylbenzimidazole, 5-methoxy-1-nonylbenzimidazole, 5-methoxy-2-methyl-1-nonylbenzimidazole, 5-chloro-1-nonyl and 1-decyl-benzimidazoles, 6-(4-nonylphenoxy)-1-methylbenzimidazole, 6-ethoxy-1-isodecylbenzimidazole, 6-(4-nitrophenoxy)-1-nonyl- and 1-decyl-benzimidazoles, 7-chloro-1-nonyl and 1-decyl benzimidazoles, benzthiazoles such as 6-nonylbenzthiazole, benzoxazoles such as 6-decylbenzoxazole, 6-nonylbenzoxazole and quinolines such as 6-dodecylquinoline.

The preferred compounds are 1-substituted benzimidazoles. It is usually convenient to have also a group, such as a lower alkyl for example a methyl or a methoxy group or chlorine atom, in the 5 position since this facilitates preparation of the compound.

The compounds may be prepared by any of the conventional and well-known general methods applicable to compounds of the formula I using suitable intermediates to provide products containing alkyl, alkenyl or cycloalkyl groups containing at least five carbon atoms in the product.

The process of the invention may conveniently be carried out by bringing together the aqueous solution containing metal values usually in the form of metal salt and a solution of the compound in the organic solvent at a suitable temperature, conveniently ambient temperature, agitating or otherwise disturbing the mixture of liquids so that the area of the water-solvent interfacial layer is increased in order to promote complex formation and extraction, and then decreasing the agitation or disturbance so that the aqueous and solvent layers settle and can be conveniently separated. The process may be carried out in a batchwise manner or preferably continuously, in either case the solvent being if desired stripped of the metal content before re-use.

The process of the invention may be applied to the extraction of any metal which under the conditions of use, for example the nature of the organic solvent, the pH of the aqueous solution and the anions present therein, will form with the compound a stable neutral complex which will dissolve in or will completely associate with the organic solvent.

The stability of such complexes under comparable conditions will depend primarily on the metal, those from divalent copper, cobalt and zinc for example being more stable than for example nickel. The process of the invention is of particular value for the separation of cobalt from nickel values. The formation of stable neutral complexes in the process of the invention is not restricted to metals in the divalent state or to copper, cobalt and zinc. Other metals which may form complexes include manganse, trivalent iron, vanadium, tin, cadmium, silver, gold and mercury.

As organic solvent there may be used any mobile organic solvent or mixture of solvents which is immiscible with water and, under the pH conditions used, inert to water, to the metal salts, and to the compound used as extracting agent. Especially valuable solvents are aliphatic, alicyclic and aromatic hydrocarbons, such as kerosine, preferably of high flash point, and mixtures of these, and also clorinated hydrocarbons such as perchloroethylene, trichloroethane and trichloroethylene. The preferred solvents are aromatic hydrocarbons. Aliphatic hydrocarbons give higher extraction efficiencies but may not have adequate solvent power for the metal complexes; chlorinated hydrocarbons are better solvents but have lower extraction efficiencies. Other water-immiscible solvents such as esters and ethers may be used but may in some cases cause complications by themselves forming complexes with the metal.

In order to facilitate separation of the aqueous and solvent phases it is desirable to use a solvent having a different density from that of the aqueous layer.

The amount of organic solvent to be used in relation to the amount of aqueous solution may be varied widely. It will normally be chosen to be suitable considering for example the amount of metal to be extracted, the amount of compound to be used and its solubility in the organic solvent.

The amount of compound to be used in relation to the amount of metal may be varied as desired. In general the greater the molar proportion of compound the more metal which is extracted.

The complexes are only stable over a range of pH values. As the pH is lowered the complexes tend increasingly to decompose to the compound and metal salt. As the pH increases the stability also increases up to a point, depending upon the metal concerned, near neutrality at which precipitation of the metal as hydroxide tends to take place.

It is preferred that the extraction process be carried out in the absence of high concentrations of mineral acid as otherwise there is a tendency for halogen or pseudo halogen acid to be picked up by the extracting agent thus limiting the extractive power.

The complexes are only formed when the anion is a halogen ion, e.g. chloride, as for example in sodium or calcium chloride, or bromide, or a psuedohalogen ion such as thiocyanate. Anions such as sulphate do not form the complexes, but the complexes can conveniently be obtained from metal sulphate solutions to which a metal halide such as sodium chlorie has been added.

The stability of the complexes in general increases with the amount of halide or psuedohalide ion. In some cases substantial formation of a complex only takes place in presence of a large excess of halide or psuedohalide ion, reversion to the metal salt and extracting agent taking place on contact with aqueous media containing less halide or psuedohalide ion. Cobalt/nickel selectivity increases as the concentration of halide ion is raised.

The stability of the complex also depends upon the compound used, and in general upon the basicity of the nitrogen atom present, for example the stability decreases in the series X is an $NR^5$ group, a sulphur atom or an oxygen atom. Electronegative substituents, such as chloro or, especially, nitro groups in the benzene ring will decrease the stability of the complexes derived from e.g. benzimidazoles.

The metal may be isolated from the solvent after the extracting stage by any conventional process, for example, by extraction into an aqueous phase containing e.g. sulphuric acid to provide pH conditions in which the complex is unstable. Such a treatment will regenerate the compound and the solvent containing compound so recovered may conveniently be re-used in the process, especially when operated continuously. At the same time halogen or psuedohalogen acid is generated and, depending upon the basicity of the nitrogen atom in the compound, may at least in part be retained in the solvent. In those cases it may be desirable to remove the acid, for example by a water wash, before returning the solvent and compound for re-use in the process.

It is in some cases more convenient to use as extracting agent a compound which only forms a complex in presence of exess e.g. chloride ions and to recover the metal by contacting the loaded organic solvent layer with water substantially free from halide e.g. chloride ion. In these cases no hydrochloric acid is generated. The aqueous layer then obtained containing metal salt may be used as desired to isolate the metal, for example by electrolysis.

In some cases performance of the process of the invention or isolation of the metal from the solvent meets difficulties caused by emulsification of the aqueous and solvent phases. This emulsification is believed to be caused by the formation of surface-active complex ions, and is not substantially affected by the nature of the anions present but is reduced by using aromatic hydrocarbon or, better, chlorinated hydrocarbon solvents rather than aliphatic hydrocarbon solvents.

The tendency to emulsification can also be reduced by the addition of modifiers such as isodecanol or nonylphenol in amount conveniently between 5 and 15% of the weight of solvent.

The process of the invention may be applied especially to aqueous solutions resulting from leaching of mineral ores or treatment of scrap metal or other metal-containing residues with aqueous acids such as sulphuric, sulphurous, hydrochloric, or nitric acids (or for example with aqueous ammonia or ammonium carbonate) or to metal containing spent liquors from electrolytic or chemical processes.

If necessary the pH of the aqueous solutions is adjusted before use in the process of the invention, for example by addition of chalk, limestone or lime to an ore which had been leached with hydrochloric acid.

Without prejudice to the scope of the invention it is believed that the solvent-soluble complexes in the case of a divalent metal are of the type [$L_2MX_2$], wherein L is a compound of formula I, M is a divalent metal ion and X is a halogen or pseudo-halogen ion.

The invention is illustrated but not limited by the following Examples in which all parts and percentages are by weight unless otherwise stated.

EXAMPLE 1

An 8.12% solution in chloroform of 5-methyl-1-nonylbenzimidazole was shaken in a separating funnel with an equal volume of aqueous copper chloride solution containing 10 g per liter of copper ion and having a pH of 3.0. The two phases were allowed to settle, the lower organic layer was separated off and its copper content was determined. Similar experiments were carried out in which (a) the pH of the aqueous copper solution was varied by the addition of perchloric acid and (b) the copper:chloride ion ratio in the aqueous solution was varied by the addition of sodium chloride. The results are given in the following table:

| Aqueous feed solution | | Cu content of organic phase |
|---|---|---|
| pH | Cu:Cl ratio | (g per liter) |
| 1 | 1:2 | 4.57 |
| 2 | 1:2 | 6.86 |
| 3 | 1:2 | 6.93 |
| 1 | 1:4 | 5.40 |
| 2 | 1:4 | 7.94 |

The 5-methyl-1-nonylbenzimidazole used above was prepared as follows:

A stirred mixture of p-toluidine (1100 parts) and nonyl bromide (478 parts) was heated on a steam bath for 20 hours, cooled and diluted with water (200 parts). The mixture was then made alkaline with caustic soda and after separation of the aqueous phase the residual oil was distilled under reduced pressure to obtain N-nonyl-p-toluidine (452 parts) as a pale yellow oil boiling at 136°-140° C at 0.8 mm.

Acetic anhydride (340 parts) was added during 15 minutes to a stirred solution of N-nonyl-p-toluidine (452 parts) in glacial acetic acid (950 parts) and the mixture was raised to the boil for 3 hours. After cooling, water (1500 parts) was added and the mixture as made alkaline with caustic soda and extracted with ether. The ethereal extracts were washed first with dilute caustic soda solution, then with water and dried over magnesium sulphate. After removal of the solvent from the filtered ethereal solution acetyl-N-nonyl-p-toluidine was obtained as a pale brown oil (500 parts).

Acety-N-nonyl-p-toluidine (470 parts) was added to a cooled mixture of water (50 part) and nitric acid (density 1.5 g.ml.) (672 parts) at such a rate that the temperature of the mixture remained in the range 35°-40° C. When the addition was complete the mixture was stirred at 35°-40° C for a further 3 hours and poured into ice-water (1900 parts). The aqueous phase was removed by decantation and the residual oil was dissolved in ether and washed repeatedly with water. After removal of the solvent from the dried ethereal extract 4-methyl-2-nitro-N-nonylacetanilide was obtained as a brown oil (540 parts).

A stirred mixture of 4-methyl-2-nitro-N-nonylacetanilide (450 parts), sodium hydroxide (93 parts), water (905 parts) and ethanol (2740 parts) was boiled for 18 hours after which further sodium hydroxide (93 parts) was added and heating was continued for a further 20 hours. After removal of most of the solvent under reduced pressure the residual oil was diluted with water and the mixture was extracted with ether. The ethereal extracts were dried and the ether was removed to give 4-methyl-2-nitro-N-nonylaniline as a brown oil (383 parts).

A mixture of ethanol (1685 parts), water (210 parts), hydrochloric acid (density 1.18 g. ml.) (20 parts) and iron powder (820 parts) was stirred vigorously and boiled for 1 hour when an ethanolic (420 parts) solution of 4-methyl-2-nitro-N-nonylaniline (575 parts) was added during 30 minutes. The mixture was boiled for 15 hours when sodium hydroxide solution (density 1.35 g. ml.) (20 parts) were added and the mixture was filtered while still hot and the residue was washed with boiling ethanol. After removal of the solvent from the combined filtrate and washings the residual oil was distilled under reduced pressure to give 4-methyl-2-amino-N-nonylaniline (390 parts) as a pale yellow oil, boiling point 176° C. at 0.7 mm, which solidified on cooling.

A mixture of 4-methyl-2-amino-N-nonylaniline (82 parts) and formic acid (130 parts) was boiled for 2 hours, cooled and diluted with water (1000 parts). The mixture was made alkaline with caustic soda and extracted with ether. After removal of the solvent from the dried ethereal extracts 5-methyl-1-nonylbenzimidazole was obtained as a pale brown oil which solidified after purification through its complex with cobalt chloride [Found:Carbon 79.1; Hydrogen 10.3; Nitrogen 10.8. $C_{17}H_{26}N_2$ requires Carbon 79.0; Hydrogen 10.15; Nitrogen 10.85%].

EXAMPLE 2

A chloroform solution containing 1-methyl-5-dodecylbenzimidazole in molar amount equivalent to 7.5 g per liter of copper was shaken vigorously for 5 minutes with an equal volume of aqueous solutions containing 5 g per liter of copper in the form of (1) sulphate in presence of 2 molar equivalents of sodium chloride at pH 2, (2) chloride at pH 2 and (3) chloride at pH 4. The phases were then allowed to separate and the aqueous phase analysed for copper. The transfer of copper to the organic phase from the aqueous phase was as follows:

| (1) | (2) | (3) |
|---|---|---|
| 56% | 62% | 48% |

The 1-methyl-5-dodecylbenzimidazole used above was prepared by the following procedure:

A mixture of 4-dodecylaniline (400 g), acetic acid (800 ml) and acetic anhydride (300 ml) was heated at the boil for 2 hours, left to cool overnight and the precipitated solid filtered off, washed with 60/80 petrol and dried to give 252 g of 4-dodecylacetanilide, melting at 98°-100° C.

4-Dodecylacetanilide (252 g) was added portionwise over 45 minutes to a stirred solution of nitric acid (density 1.50 g. ml.) (210 ml) and water (23 ml) keeping the temperature between 35° and 40° C. The mixture was stirred for a further 30 minutes, drowned into cold water (1200 ml) and the precipitated solid filtered off, washed acid free with water, dried and recrystallised from ethanol to give 202 g of 2-nitro--dodecylacetanilide as fine needles, melting at 71°-2° C.

A solution of methyl iodide (130 g) in acetone (160 ml) was added to a stirred mixture of 2-nitro-4-dodecylacetanilide (196 g) and sodium hydroxide (130 g) in acetone (1100 ml) at room temperature. The mixture was heated rapidly and allowed to boil for 8 minutes, filtered hot and the filtrate evaporated to a semi-solid which was partitioned between toluene (800 ml) and water (400 ml). The organic layer was washed with water, dried and evaporated to give 199 g of 2-nitro-4-dodecyl-N-methylacetanilide as a dark oil.

A solution of 2-nitro-4-dodecyl-N-methylacetanilide (199 g) and sodium hydroxide (19.7 g) in ethanol (800 ml) and water (250 ml) was heated at the boiling point overnight, cooled and the solid filtered off and recrystallised from ethanol to give 125 g of 2-nitro-4-dodecyl-N-methylaniline as orange clusters melting at 54° C. [Found: Carbon 71.0; Hydrogen 10.1; Nitrogen 8.5. $C_{19}H_{32}N_2O_2$ requires Carbon 71.2; Hydrogen 10.0; Nitrogen 8.7]. 8.7].

A solution of 2-nitro-4-dodecyl-N-methylaniline (32 g) in ethanol (250 ml) was hydrogenated using 5% palladium on charcoal (3 g) as catalyst. The mixture was filtered and the filtrate evaporated to dryness to give 29 g of 2-amino-4-dodecyl-N-methylaniline as a dark grey waxy solid.

A solution of 1-methyl-5-dodecylbenzimidazole (12.5 g) in formic acid (98-100%, 20 ml) was heated at the boiling point for 1 hour, poured into ice/water, made alkaline with sodium carbonate and extracted with toluene. The extracts were washed with water, dried and evaporated to give 12 g of 1-methyl-5-dodecylbenzimidazole as a buff solid melting at 76° C. This afforded a cobalt complex having Carbon 64.6; Hydrogen 8.9; Nitrogen 8.5; Cobalt 8.14 and Chlorine 9.3. $C_{20}H_{32}N_2COCl_2$ requires Carbon 65.8, Hydrogen 8.8, Nitrogen 7.7, Cobalt 8.1 and Chlorine 9.7].

EXAMPLE 3

An aqueous solution containing about 2 g. per liter of cobalt as chloride and 30% of sodium chloride was shaken for five minutes successively with three equal volumes of a chloroform solution containing 1-methyl-5-dodecylbenzimidazole equivalent to 3 g. per liter of cobalt. After each contact the phases were allowed to separate and the aqueous phase analysed for cobalt content. The procedure was repeated using a cobalt solution containing 15% of sodium chloride. The cobalt contents found were as follows:

| Sodium Chloride % | Cobalt Content of Aqueous Phase | | | |
|---|---|---|---|---|
| | After 1st Contact | After 2nd Contact | After 3rd Contact | Original Solution |
| 15 | — | 1.31 | 1.08 | 2.12 |
| 30 | 0.8 | 0.15 | 0.03 | 2.12 |

EXAMPLE 4

Chloroform solutions containing 18.27% of 5-methyl-1-nonyl-benzimidazole were obtained for 15 minutes at 25° C with equal volumes of aqueous solutions at pH 2 containing 0.994 g. per liter of cobalt (as cobaltous chloride) and varying amounts of sodium chloride. After separation of the organic and aqueous phases the amount of cobalt in the aqueous phase was determined.

The table below illustrates the variation in amount of cobalt extracted with the concentration of sodium chloride.

| Sodium Chloride g./liter | Cobalt in Aqueous g./liter | Cobalt in Organic g./liter | % of Cobalt extracted |
|---|---|---|---|
| 1.20 | 0.976 | 0.018 | 1.81% |
| 10 | 0.784 | 0.210 | 21.13% |
| 20 | 0.562 | 0.432 | 43.46% |
| 30 | 0.374 | 0.620 | 62.37% |
| 40 | 0.254 | 0.740 | 74.45% |
| 50 | 0.173 | 0.821 | 82.60% |
| 60 | 0.123 | 0.871 | 87.63% |
| 100 | 0.031 | 0.963 | 96.88% |

EXAMPLE 5

Chloroform solutions containing 18.27% of 5-methyl-1-nonylbenzimidazole which had been loaded with 10 g. per liter of cobalt were stirred for 15 minutes at 25° C with varying volumes of aqueous solutions at pH 5.8 containing 40.21 g. per liter of cobalt (as sulphate). After separation of the aqueous and organic layers the amount of cobalt in the aqueous layer was determined. The table below illustrates the variation in cobalt stripped from the organic layer at various relative aqueous/organic volumes.

| Volume of Aqueous | Volume of Organic | Cobalt in Aqueous g. per liter | Cobalt in Organic g. per liter |
|---|---|---|---|
| 60 | 15 | 42.58 | 0.289 |
| 50 | 25 | 44.66 | 0.939 |
| 25 | 25 | 47.43 | 2.60 |
| 10 | 20 | 50.32 | 5.06 |
| 10 | 40 | 52.98 | 6.76 |
| 10 | 80 | 54.94 | 8.21 |

EXAMPLE 6

The procedure of Example 4 was repeated but replacing the cobalt (as chloride) with 1 g. per liter of zinc (as chloride). The following results were obtained:

| Sodium Chloride g. per liter | Zinc in Aqueous g. per liter | Zinc Inorganic g. per liter | % of Zinc extracted |
|---|---|---|---|
| 1.084 | 0.1439 | 0.8561 | 85.61 |
| 5 | 0.0026 | 0.9974 | 99.74 |
| 10 | 0.0051 | 0.9950 | 99.50 |

EXAMPLES 7 – 11

By the general procedure described in Example 1 using as appropriate p-toluidine, p-anisidine, or 3- or 4-chloroaniline and isoctyl bromide, nonyl bromide or isodecylbromide (complex mixture of isomers) there are obtained:

7. 1-Octyl-5-methylbenzimidazole, pale yellow oil boiling at 140° – 142° C at a pressure of 0.25 mm. of mercury.

8. 1-Decyl-5-methylbenzimidazole, pale yellow oil, boiling at 164°–165° C at a pressure of 0.3 mm. of mercury. Analysis: Found: C, 79.0; H, 10.5; N, 10.3; $C_{18}H_{28}N_2$ requires C, 79.35; H, 10.35; N, 10.3%. 1-Nonyl-5-methoxybenzimidazole, pale yellow oil which 9. solidified on standing, purified via cobalt complex of which the analysis was: C, 60.1; H, 7.7; N, 8.2. $C_{34}H_{52}N_4O_2CoCl_2$ requires C, 60.1; H, 7.7; N, 8.25%.

10. 1-Nonyl-4-chlorobenzimidazole, solid of low melting point. 11. 1-Nonyl-5-chlorobenzimidazole, colourless low-melting solid. Analysis: Found: C, 69.1, H, 8.4; N, 9.8; Cl, 12.8. $C_{16}H_{23}N_2Cl$ requires C, 68.95; H, 8.25; N, 10.0; Cl, 12.75%.

EXAMPLES 12 – 15

The appropriate 4-methyl (or methoxy)-2-nitro-N-octyl (nonyl or decyl) acetanilide, prepared as described in Example 1 or Examples 7–11, was reduced by the procedure described in Example 1 for the corresponding 2-nitroalkylaniline and the 2-amino-N-alkylacetanilide obtained heated at the boiling point with acetic acid and the 4N hydrochloric acid to give the following products:

12. 1-Octyl-2,5-dimethylbenzimidazole, pale yellow oil boiling at 146% under a pressure of 0.3 mm. of mercury.

13. 1-Nonyl-2,5-dimethylbenzimidazole, pale yellow oil; purified via cobalt complex of which the analysis was: C, 65.0; H, 9.0; N, 8.3. $C_{36}H_{56}N_4CoCl_2$ requires C, 64.05; H, 8.35; N, 8.3%.

14. 1-Decyl-2,5-dimethylbenzimidazole, pale yellow oil, boiling at 160°-2° C at a pressure of 0.2 mm. of mercury.

15. 1-Nonyl-2-methyl-5-methoxybenzimidazole, pale yellow oil which solidified on cooling. Purified via cobalt complex which analysed as follows: C, 61.4; H, 8.1; N, 8.3; $C_{36}H_{56}N_4 O_2CoCl_2$ requires C, 61.5; H, 8.0; N, 7.9%.

These compounds were also obtained by heating the appropriate 2-aminoalkylanilines with acetic acid.

EXAMPLES 16 and 17

By the procedure described in Example 2, using the appropriate p-octyl or p-decylaniline there were obtained the following:

16. 1-Methyl-5-octylbenzimidazole, pale yellow oil boiling at 150–152% at a pressure of 0.25 mm. of mercury. Analysis: Found: C, 79.2; H, 9.4; N, 11.9. $C_{16}H_{23}N_2$ requires C, 78.7; H, 9.8; N, 11.5%.

17. 1Methyl-5-decylbenzimidazole, pale yellow oil boiling at 160° C at a pressure of 0.11 mm. of mercury. Purified via cobalt complex of which the analysis was C, 63.9; H, 8.6; N, 8.3; Cl; 10.5; Co, 8.9. $C_{36}H_{56}N_4CoCl_2$ requires C, 64.1; H, 8.5, N, 8.3; Cl, 10.5; Co. 8.85%.

EXAMPLES 18–21

The appropriate 4-octyl(nonyl, decyl or dodecyl)-2-nitro-N-methylacetanilide, prepared as described in Example 1 or Examples 12–15, was reduced by the procedure described in Example 1 for the 2-nitroanilines, and the 2-amino-N-methylacetanilide obtained heated at the boiling point with acetic acid and 4N hydrochloric acid to give the following products:

18. 1,2-Dimethyl-5-octylbenzimidazole, pale yellow oil, boiling 163° C at a pressure of 0.15 mm. of mercury.

19. 1,2-Dimethyl-5-nonylbenzimidazole, colourless plates melting at 102° after crystallisation from light petroleum. Analysis: Found: C, 79.0; H, 10.5; N, 10.5. $C_{18}H_{28}N_2$ requires C, 79.35; H, 10.35; N, 10.3%.

20. 1,2-Dimethyl-5-decylbenzimidazole, pale yellow oil which solidified on cooling. Analysis: Found: C, 79.3; H, 10.8; N, 9.8. $C_{19}H_{30}N_2$ requires C, 79.5; H, 10.8; N, 9.8%.

21. 1,2-Dimethyl-5-dodecylbenzimidazole, colourless plates melting at 96° –97° C after crystallisation from light petroleum. Analysis: Found: C, 80.0; H, 10,9; N, 8.85. $C_{21}H_{34}N_2$ requires C, 80.2; H, 10.9; N, 8.9%.

EXAMPLE 22

Aqueous solutions were made up containing 10 g. per l. of cobalt as cobalt (III) chloride and 10 g. per l. of nickel as nickel (III) chloride at pH 2 and containing also (1) 9.72 g. per l. of sodium chloride (2) 59.96 g. per l. of sodium chloride or (3) 125.12 g. per l. of sodium chloride. A solution in Aromasol H (a mixed aromatic hydrocarbon solvent) containing 1-isodecyl-5-methylbenzimidazole in amount corresponding to 15 g. per l. of cobalt (II) was also prepared. A 50 ml. portion of the Aromasol solution was agitated with two successive 50 ml. portions of aqueous solution (1), the aqueous and Aromasol phases being separated after agitation in each case and the aqueous phases analysed for cobalt (II). The Aromasol phase was then stripped of cobalt and nickel by agitating with water and the aqueous layer then separated and analysed for both nickel and cobalt to provide values for the cobalt and nickel content of the Aromasol phase. The extraction and strip procedures were repeated for aqueous solutions (2) and (3). The results were as follows:

| Solution (1) | First aqueous raffinate contained | 6.56 g. per l. of cobalt |
|---|---|---|
| | Second aqueous raffinate contained | 9.0 g. per l. of cobalt |
| | Aromasol phase after both extractions contained | 3.58 g. per l. of cobalt |
| | Aromasol phase after both extractions contained | 0.039 g. per l. of nickel |
| | corresponding to a cobalt/nickel selectivity of 92/1. | |

-continued

| | | | |
|---|---|---|---|
| Solution (2) | First raffinate contained | 3.70 | g. per l. of cobalt |
| | Second raffinate contained | 7.95 | g. per l. of cobalt |
| | Aromasol phase contained | 6.5 | g. per l. of cobalt |
| | Aromasol phase contained | 0.026 | g. per l. of nickel |
| Cobalt/nickel selectivity 250/1 | | | |
| Solution (3) | First raffinate contained | 1.75 | g. per l. of cobalt |
| | Second raffinate contained | 7.88 | g. per l. of cobalt |
| | Aromasol phase contained | 8.36 | g. per l. of cobalt |
| | Aromasol phase contained | 0.015 | g. per l. of nickel |
| Cobalt/nickel selectivity 557/1 | | | |

We claim:

1. A process for extracting a metal selected from the group consisting of cobalt, copper and zinc from aqueous solutions of salts thereof which comprises contacting said aqueous solutions in the presence of a halogen or psuedo-halogen anion with a solution in a water-immiscible organic solvent of a benzimidazole having an alkyl group in position 1 and optionally having an alkyl, methoxy or chloro group substituent in position 5 or 6, the alkyl group or groups in said benzimidazole containing a total of at least 7 and not more than 25 carbon atoms.

2. A process as claimed in claim 1 wherein the substituent in position 1 is a branched chain alkyl group.

3. A process as claimed in claim 1 wherein there is used a mixture of two or more benzimidazoles, each as defined in claim 1 and differing only in the configuration of an alkyl group.

4. A process as claimed in claim 1 wherein the halogen anion is chloride.

5. A process as claimed in claim 1 wherein the metal to be extracted is cobalt in presence of nickel.

6. A process as claimed in claim 1 wherein the metal is recovered as an aqueous solution of metal halide by extracting the metal-loaded water-immiscible organic solvent with water substantially free from halide ion.

* * * * *